US008055118B2

(12) United States Patent
Nakagawa

(10) Patent No.: US 8,055,118 B2
(45) Date of Patent: Nov. 8, 2011

(54) AUDIO VISUAL RECORDING AND REPRODUCING APPARATUS

(75) Inventor: Yoshio Nakagawa, Daito (JP)

(73) Assignee: Funai Electric Co., Ltd., Osaka (JP)

( * ) Notice: Subject to any disclaimer, the term of this patent is extended or adjusted under 35 U.S.C. 154(b) by 1051 days.

(21) Appl. No.: 11/976,157

(22) Filed: Oct. 22, 2007

(65) Prior Publication Data
US 2008/0095517 A1    Apr. 24, 2008

(30) Foreign Application Priority Data

Oct. 24, 2006    (JP) ................. 2006-289178

(51) Int. Cl.
*H04N 9/80*    (2006.01)
(52) U.S. Cl. ........................................ 386/241; 386/261
(58) Field of Classification Search ................. 386/200, 386/241, 257, 261
See application file for complete search history.

(56) References Cited

U.S. PATENT DOCUMENTS

| | | | | |
|---|---|---|---|---|
| 6,396,999 B1 * | 5/2002 | Van Gestel | ................. | 386/200 |
| 7,444,402 B2 * | 10/2008 | Rennels | ................. | 709/224 |
| 2002/0007371 A1 * | 1/2002 | Bray | ................. | 707/501.1 |
| 2003/0194211 A1 * | 10/2003 | Abecassis | ................. | 386/69 |
| 2006/0127056 A1 * | 6/2006 | Yahata et al. | ................. | 386/112 |

FOREIGN PATENT DOCUMENTS

| | | |
|---|---|---|
| JP | 10-242874 | 9/1998 |
| JP | 11-103449 | 4/1999 |
| JP | 11-341377 | 12/1999 |
| JP | 2000-201304 | 7/2000 |
| JP | 2002-538686 | 11/2002 |
| JP | 2003-006980 | 1/2003 |
| JP | 2004-007514 | 1/2004 |
| JP | 2006-019982 | 1/2006 |
| JP | 2006-140678 | 6/2006 |
| JP | 2006-186849 | 7/2006 |

* cited by examiner

*Primary Examiner* — Huy T Nguyen
(74) *Attorney, Agent, or Firm* — Morgan, Lewis & Bockius LLP

(57) ABSTRACT

A combination apparatus incorporating a hard disk drive and an optical disc drive (audio-visual recording and reproducing apparatus) stores one or more keywords inputted as a result of user operation in a memory and monitors whether or not a closed caption signal contains any of the keywords. When the closed caption signal contains at least one of the keywords, output of images and audio corresponding to this closed caption signal and subsequent images and audio is stopped. A blue background may be outputted during stopping of outputting. The stopping of outputting may be released after a predetermined period elapses. When at least one of the keywords is contained in a closed caption signal during recording, images corresponding to the closed caption signal are subjected to mosaic processing and are recorded.

11 Claims, 3 Drawing Sheets

AUDIO VISUAL RECORDING AND REPRODUCING APPARATUS

This application is based on Japanese Patent Application No. 2006-289178 filed on Oct. 24, 2006, the contents of which are hereby incorporated by reference.

BACKGROUND OF THE INVENTION

1. Field of the Invention

The present invention relates to an audio-visual recording and reproducing apparatus equipped with a controller for controlling a closed caption signal.

2. Description of Related Arts

With the advent of digital broadcasting, as broadcasting has become multichannel, program content has also become more diversified. Further, optical discs such as DVDs have also become widespread, with a wide range of DVD titles also being provided. Situations where content such as programs and titles may depict scenes of violence or adult images may also therefore occur. "Parental locks" are therefore applied to restrict viewing of scenes it is not wished to show to children. By then reading out parental supervision information such as age restrictions from a signal, it is possible to restrict viewing when the age of the user corresponds to the age restriction.

Various technology relating to parental locks has been proposed. For example, JP-A-2004-7514 discloses a digital broadcast receiving apparatus where self-programmed parental supervision information that can be arbitrarily set and changed by a user is stored in an information storage section for each program. This type of parental supervision information is stored separately from parental supervision information added to each program by a broadcasting station. When a program viewing request is then made, it is determined whether or not the program is a program for which viewing is restricted. This determination is made based on a parental supervision value and a self-programmed parental supervision value for program information for a specific program. It is then indicated as to whether or not viewing is permitted.

Further, for example, JP-A-2006-140678 discloses a television receiver with recording and reproducing apparatus provided with a section for applying a viewing restriction function to a recording and reproducing apparatus-side. Viewing restrictions are then applied only to images exceeding a viewing restriction level set at the time of editing by the recording and reproducing apparatus.

In JP-A-2004-7514, viewing is restricted using self-programmed parental supervision information, while in JP-A-2006-140678, viewing is restricted using viewing restricting levels. This means that viewing is restricted using age. However, the method of applying viewing restrictions desired by the user is not just limited to age restrictions. The scenes that it is not wished to view may vary depending on the person. For example, it may be wished not to view a scene for religious reasons or for personal reasons.

SUMMARY OF THE INVENTION

It is therefore an object of the present invention to provide an audio-visual recording and reproducing apparatus that is able to apply viewing restrictions depending on the reasons of each individual user.

To achieve the above object, in the present invention, a controller for recognizing a closed caption signal contained in image data and carrying out control of a predetermined operation is provided in an audio-visual recording and reproducing apparatus. The controller operates in such a way that setting of one or more keywords for restricting viewing is carried out, monitors whether or not the closed caption signal contains any of the keywords, and, when the closed caption signal contains at least one of the keywords, carries out stopping of an output of an image corresponding to the closed caption signal and subsequent images.

According to the present invention, it is possible to apply viewing restrictions depending on reasons given by individual users by applying viewing restrictions to scenes when keywords registered by a user are contained in a closed caption signal. As a result, it is possible to provide an audio-visual recording and reproducing apparatus that adds value by giving a high degree of user satisfaction.

DETAILED DESCRIPTION OF PREFERRED EMBODIMENTS

Figure 1:
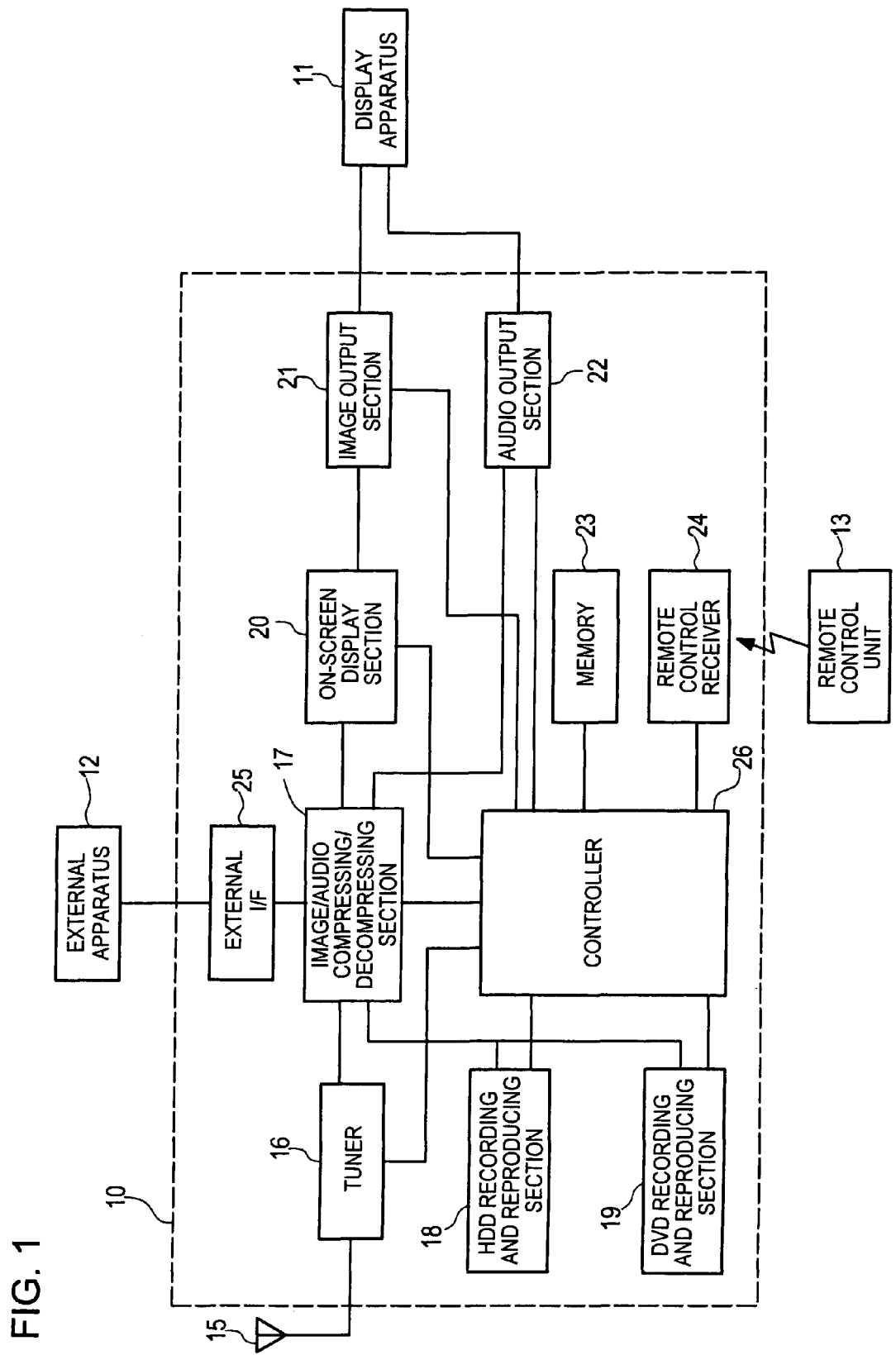
FIG. 1 is a block view showing a configuration for a combination apparatus incorporating a hard disk drive and an optical disc drive, and surrounding equipment of the present invention.

A description is given in the following using combination apparatus incorporating a hard disk drive (HDD) and an optical disc drive as an example of audio-visual recording and reproducing apparatus. FIG. 1 is a block view showing a configuration for a combination apparatus incorporating a hard disk drive and an optical disc drive 10 (hereinafter, simply referred to as "combination apparatus") and surrounding equipment. A display apparatus 11 such as a television set and an external apparatus 12 typified by an audio-visual recording apparatus such as a set top box for cable television or satellite broadcasts or the like, or a VCR etc. are connected to the combination apparatus 10. The combination apparatus 10 is capable of being operated by a remote control unit 13. The following description takes a DVD as an example of an optical disc.

The combination apparatus 10 is provided with a tuner 16 for demodulating and digitizing television broadcast signals received by the antenna 15; an image and audio compressing and decompressing section 17 for compressing and encoding image and audio data received from the tuner 16 or the external apparatus 12 while conforming to MPEG2 etc., and decompressing and decoding compressed and encoded image data reproduced by an HDD recording and reproducing section 18 or a DVD recording and reproducing section 19; the HDD recording and reproducing section 18 for recording compressed and encoded image and audio data received from the image and audio compressing and decompressing section 17 on a HDD and reproducing the data recorded on the HDD; the DVD recording and reproducing section 19 for recording compressed and encoded image and audio data received from the image and audio compressing and decompressing section 17 on an inserted DVD and reproducing the data recorded on the DVD; an OSD (On-Screen Display) 20 capable of being set while displaying various setting values on parts of the display apparatus 11; an image output section 21 for putting an image signal from the OSD 20 into analog form for output to the display apparatus 11; an audio output section 22 for putting the audio signal from the image and audio compressing and decompressing section 17 into the form of an analog signal for output to the display apparatus 11; a memory 23 consisting of ROM and RAM; a remote control receiver 24 for receiving signals from the remote control unit 13; an external I/F 25 which the external apparatus 12 is connected to; and a controller 26 for controlling each section of the combination apparatus 10.

Further, the controller 26 carries out control to restrict viewing of specific scenes utilizing a closed caption signal (hereinafter referred to as CC signal) contained in the image signal. The CC signal contains image data and is read out by the image and audio compressing and decompressing section 17. The following is a description of control of viewing restrictions.

Figure 2:
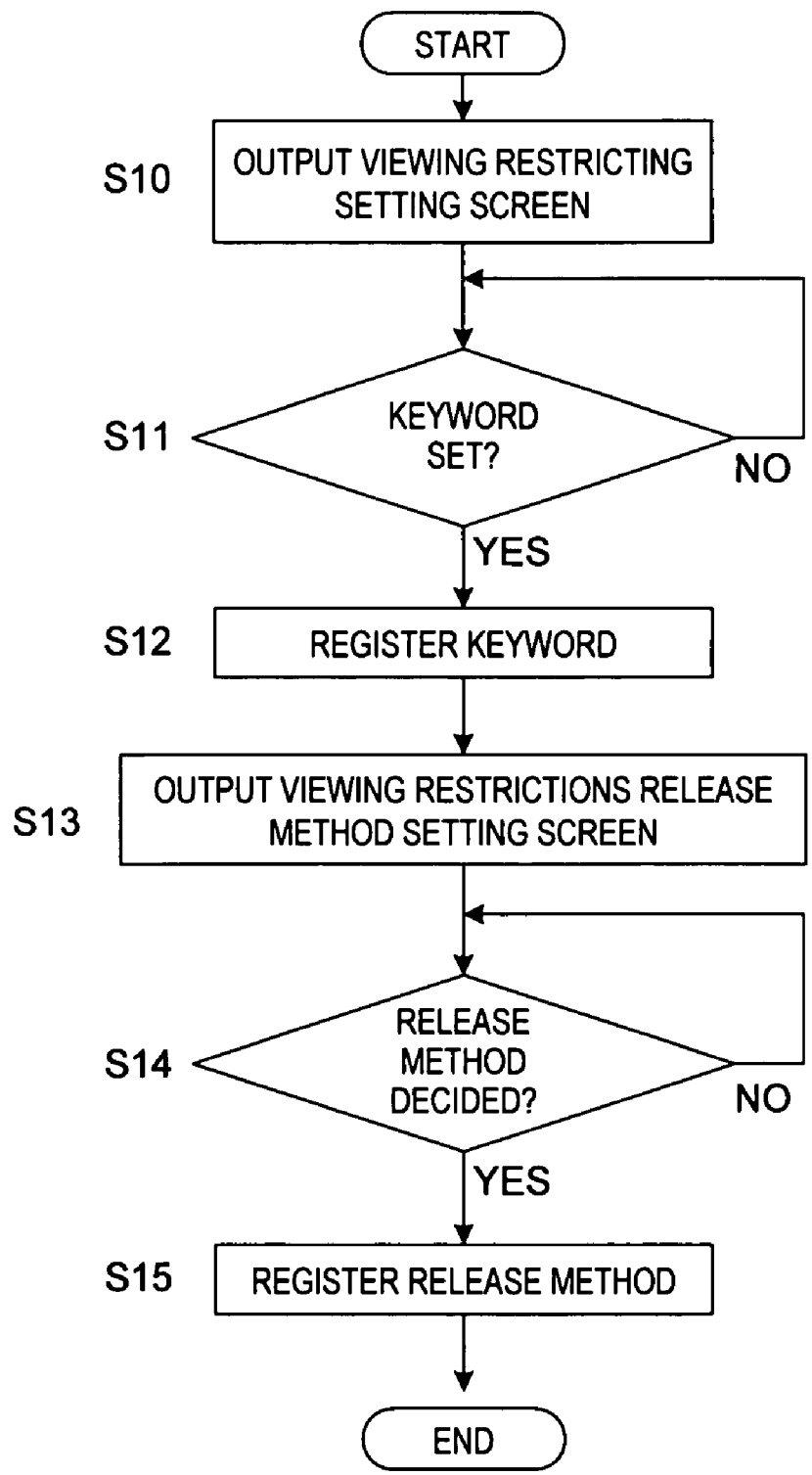
FIG. 2 is a flowchart showing the operation of the combination apparatus incorporating a hard disk drive and an optical disc drive as pertaining to setting of viewing restrictions of the present invention.

FIG. 2 is a flowchart showing the operation of the combination apparatus 10 as pertaining to setting of viewing restrictions of the present invention. First, before the start of or during execution of receiving of a television broadcast or reproduction of a DVD or HDD, when an image screen is called in order to set viewing restrictions as a result of the remote control unit 13 being operated, in step S10, the controller 26 displays a viewing restricting setting screen on the display apparatus 11. The viewing restricting setting screen is stored in advance in the memory 23. Several keywords may be displayed in a selectable manner or a user may input arbitrary keywords on the viewing restricting setting screen in order to apply viewing restrictions. Further, it is also desirable to make it possible to set a plurality of keywords from the viewpoint of improving ease of use. It is also preferable to, for example, select language associated with scenes it is wished to subject to viewing restrictions as keywords, so as to, for example, select "gun" or "pistol" when it is wished to subject violent scenes to viewing restrictions.

Next, step S11 is proceeded to from step S10, a keyword is selected or inputted, and it is determined whether or not a select key (not shown) has been pressed down. If the user then sets at least one or more desired keywords, step S12 is proceeded to and the one or more keywords are registered (stored) in the memory 23.

Next, step S13 is proceeded to and a screen for setting a method for releasing viewing restrictions is displayed on the display apparatus 11. The viewing restrictions releasing method setting screen is stored in advance in the memory 23. As a method for releasing viewing restrictions, it is possible to, for example, automatically release viewing restrictions after a predetermined period elapses from the start of the viewing restrictions, it is possible to release viewing restrictions as a result of inputting of a password, or it is possible to release viewing restrictions as a result of a power supply going off. A combination of these methods of releasing may also be adopted.

In the case of adoption of the method of releasing where releasing takes place automatically after a predetermined period of time elapses from the start of the viewing restrictions, on the viewing restrictions releasing method setting screen, a predetermined period (for example, ten seconds) may be arbitrarily selected or inputted or a predetermined period decided at the time of manufacture may be employed.

Further, when a releasing method where releasing takes place as a result of inputting of a password is adopted, on the viewing restrictions releasing method setting screen, it is made possible for the desired password to be registered.

Further, when a releasing method where releasing takes place as a result of a power supply going off is adopted, on the viewing restriction releasing method setting screen, it is sufficient to make an item for releasing as a result of the power supply going off selectable.

In this embodiment, a description is given of the case of adopting a releasing method where releasing takes place automatically after a predetermined period of time elapses. Step S14 is then proceeded to from step S13, and it is determined whether or not this releasing method is decided. In step S14, when a value of the predetermined period is inputted, step S15 is proceeded to, and the inputted value of the predetermined period is registered in the memory 23. Setting of viewing restrictions is therefore complete in the above. It is also possible to add a function for switching viewing restrictions between being valid and being invalid. Further, keyword registration may be carried out for each individual user name. As a result, setting of viewing restrictions does not have to be carried out every time the user that is viewing changes to a different viewer and this improves ease of use.

When it is wished to stop the operation of FIG. 2 midway, interruption can be performed at any time by pressing a cancel key (not shown). Further, a "back key" (not shown) may simply be pressed when it is wished to return to one screen previous.

Figure 3:
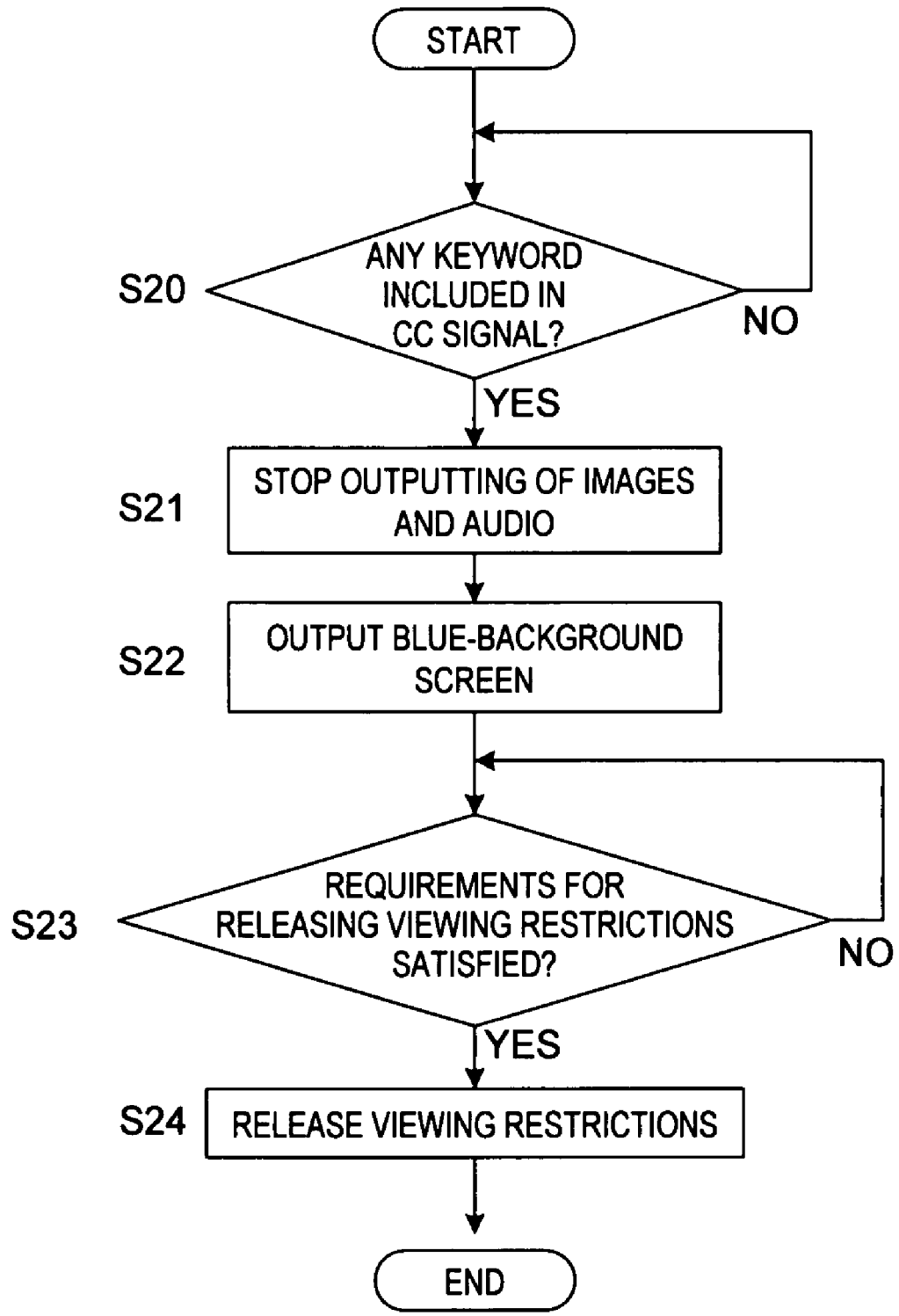
FIG. 3 is a flowchart showing the operation of the combination apparatus incorporating a hard disk drive and an optical disc drive as pertaining to execution of viewing restrictions of the present invention.

FIG. 3 is a flowchart showing the operation of the combination apparatus 10 as pertaining to execution of viewing restrictions of the present invention. After setting viewing restrictions as shown in FIG. 2, when receiving of a television broadcast or execution of reproduction of a DVD or HDD takes place, output of images and audio starts. In step S20, it is then observed as to whether registered keywords are contained in the CC signals that are being received or are being reproduced. This may be achieved by analyzing the CC signals in a buffer and determining whether or not words that match with keywords are present. If words are present that do not match completely with any of the keywords but are similar, it is also possible to consider such words as being a match.

In step S20, when at least one keyword is contained in the CC signal, step S21 is proceeded to. Output of images and audio corresponding to the signal containing the keywords and the output of subsequent images and audio is then stopped. In the case of reproducing a DVD or an HDD, the output is stopped but reproduction continues. Step S22 is then proceeded to, and stopping of the output is displayed by showing a blue background on the display apparatus 11. This is to differentiate it from stopping of the apparatus.

It is also possible to only stop output of images in step S21. This is for when just stopping output of images is sufficiently effective in restricting viewing. It is also possible for a user to select whether to stop output of just images or whether to stop output of images and audio.

Further, it is also possible to output images that have been subjected to mosaic processing or to output images that result in restricted viewing such as other images such as, for example, a message indicating that viewing is currently restricted or the like, instead of displaying the blue background in step S22. It is also possible to output a screen inviting the inputting of a password when input of a password is taken as a release condition.

Next, step S23 is proceeded to from step S22, and it is determined whether or not requirements for releasing viewing restrictions are satisfied. In this embodiment, it is determined whether or not the predetermined period has elapsed from the start of viewing restrictions. In step S23, if the predetermined period has elapsed, step S24 is proceeded to and viewing restrictions are released. Namely, normal images and audio are outputted from the time of releasing.

Further, when a television broadcast is recorded on HDD or DVD, when dubbing takes place from an HDD to a DVD, or when input from the external apparatus 12 is recorded to an HDD or a DVD, if the viewing restrictions are effective, control takes place so that images and audio subjected to viewing restrictions are recorded on the HDD or DVD. For example, if a registered keyword is contained in the CC signal during dubbing from the HDD to the DVD, this scene is subjected to mosaic processing and recording takes place. As a result, it is possible to produce a DVD subjected to viewing restrictions. Even if this DVD is then reproduced on apparatus not in possession of a viewing restriction function, it is possible to output images subjected to viewing restrictions.

What is claimed is:

1. Audio-visual recording and reproducing apparatus comprising:
    a controller for recognizing a closed caption signal contained in image data and carrying out control of a predetermined operation,
    wherein the controller operates in such a way that setting of one or more keywords for restricting viewing is carried out,
    the controller monitors whether or not the closed caption signal contains any of the keywords,
    when the closed caption signal contains at least one of the keywords, the controller carries out stopping of an output of an image corresponding to the closed caption signal and subsequent images, and
    wherein, when a closed caption signal for data being recorded contains at least one of the keywords, an image corresponding to the closed caption signal and images thereafter are subjected to mosaic processing and recorded.

2. The audio-visual recording and reproducing apparatus according to claim 1,
    wherein the stopping of the output is released after a predetermined period elapses.

3. The audio-visual recording and reproducing apparatus according to claim 1,
    wherein the stopping of the output is released by inputting a password.

4. The audio-visual recording and reproducing apparatus according to claim 1,
    wherein the stopping of the output is released by a power supply going off.

5. The audio-visual recording and reproducing apparatus according to claim 1,
    wherein the one or more keywords are inputted as a result of user operation.

6. The audio-visual recording and reproducing apparatus according to claim 1,
    wherein a blue background is outputted during stopping of the output.

7. Audio-visual recording and reproducing apparatus comprising:
    an HDD recording and reproducing section and/or a DVD recording and reproducing section;
    a tuner for demodulating/digitizing a television broadcast signal received by an antenna;
    an image and audio compressing and decompressing section for compressing and encoding image and audio data received from the tuner and decompressing and decoding compressed image data reproduced by the HDD recording and reproducing section or the DVD recording and reproducing section;
    an on-screen display section capable of being set while displaying various setting values on a part of a display apparatus;
    an image output section for putting an image signal from the on-screen display section into analog form for output to the display apparatus;
    an audio output section for putting an audio signal from the image and audio compressing and decompressing section into analog form for output to the display apparatus;
    a memory; and
    a controller for controlling each section of the apparatus,
    wherein the controller stores one or more keywords inputted in order to restrict viewing by user operation in the memory,
    the controller monitors whether or not a closed caption signal in the image data contains any of the keywords,
    when the closed caption signal contains at least one of the keywords, the controller carries out stopping of an output of an image and audio corresponding to the closed caption signal and subsequent images and audio,
    the controller outputs a predetermined image during the stopping of the output and releases the stopping of the output after a predetermined period elapses, and
    wherein, when a closed caption signal for data being recorded contains at least one of the keywords, an image corresponding to the closed caption signal and images thereafter are subjected to mosaic processing and recorded.

8. The audio-visual recording and reproducing apparatus according to claim 7,
    wherein the stopping of the output is released by inputting a password.

9. The audio-visual recording and reproducing apparatus according to claim 7,
    wherein the stopping of the output is released by a power supply going off.

10. The audio-visual recording and reproducing apparatus according to claim 7,
    wherein the one or more keywords are inputted as a result of user operation.

11. The audio-visual recording and reproducing apparatus according to claim 7,
    wherein the predetermined image is an image of a blue background.

* * * * *